United States Patent
Kawata

(10) Patent No.: US 11,073,115 B2
(45) Date of Patent: Jul. 27, 2021

(54) INTAKE DUCT STRUCTURE OF MOTORCYCLE

(71) Applicant: SUZUKI MOTOR CORPORATION, Hamamatsu (JP)

(72) Inventor: Koichiro Kawata, Hamamatsu (JP)

(73) Assignee: SUZUKI MOTOR CORPORATION

( * ) Notice: Subject to any disclaimer, the term of this patent is extended or adjusted under 35 U.S.C. 154(b) by 0 days.

(21) Appl. No.: 16/565,618

(22) Filed: Sep. 10, 2019

(65) Prior Publication Data
US 2020/0158055 A1 May 21, 2020

(30) Foreign Application Priority Data

Nov. 21, 2018 (JP) .............................. JP2018-218438

(51) Int. Cl.
*F02M 35/10* (2006.01)
*B62K 11/04* (2006.01)

(52) U.S. Cl.
CPC ....... *F02M 35/10078* (2013.01); *B62K 11/04* (2013.01); *F02M 35/10052* (2013.01); *F02M 35/10111* (2013.01)

(58) Field of Classification Search
CPC ....... F02M 35/10052; F02M 35/10078; F02M 35/10111; B60K 13/02; B62K 11/04
USPC ............ 123/184.21, 184.24, 184.31, 184.32, 123/184.34, 184.46, 184.47, 184.61, 123/198 E, 41.7, 572–574, 432
See application file for complete search history.

(56) References Cited

U.S. PATENT DOCUMENTS

| | | | | |
|---|---|---|---|---|
| 5,301,767 A * | 4/1994 | Shiohara | ................ | B60K 13/06 180/219 |
| 5,577,570 A * | 11/1996 | Shiohara | ................ | B60K 13/02 180/219 |
| 6,142,123 A * | 11/2000 | Galasso | .................... | B62M 7/02 123/486 |
| 7,380,624 B2 * | 6/2008 | Momosaki | ....... | F02M 35/10013 180/68.3 |
| 2005/0051375 A1 * | 3/2005 | Momosaki | ....... | F02M 35/10262 180/219 |
| 2005/0183690 A1 * | 8/2005 | Nishizawa | ....... | F02M 35/10052 123/198 E |
| 2008/0190683 A1 * | 8/2008 | Hoeve | .................... | B60K 13/06 180/229 |
| 2009/0166121 A1 * | 7/2009 | Hiramatsu | ............. | B62K 11/04 180/291 |
| 2009/0241868 A1 * | 10/2009 | Morita | ............... | F02M 35/0203 123/54.4 |
| 2016/0076494 A1 * | 3/2016 | Nishimura | ........... | F02M 35/024 180/219 |

(Continued)

FOREIGN PATENT DOCUMENTS

JP H1035559 A 2/1998

*Primary Examiner* — John Kwon
*Assistant Examiner* — Johnny H Hoang
(74) *Attorney, Agent, or Firm* — Barnes & Thornburg LLP

(57) ABSTRACT

An intake duct structure of a motorcycle includes front forks disposed on both of right and left sides of a head pipe of a body frame and a main frame extending obliquely backward and downward from the head pipe, wherein the intake duct structure extends from a front end of the motorcycle toward the head pipe and is formed in such a manner that an interfered area where a rotational orbit of the front forks at a time of steering overlaps the intake duct structure is elastically deformable.

2 Claims, 7 Drawing Sheets

(56) References Cited

U.S. PATENT DOCUMENTS

2017/0089307 A1* 3/2017 Arai ...................... F02M 35/02

* cited by examiner

US 11,073,115 B2

INTAKE DUCT STRUCTURE OF MOTORCYCLE

CROSS-REFERENCE TO RELATED APPLICATION

This application claims the benefit of priority of Japanese Patent Application No. 2018-218438, filed Nov. 21, 2018, the entire contents of which are incorporated herein by reference.

BACKGROUND OF THE INVENTION

Field of the Invention

Embodiments of the present invention relate to an intake duct structure of a motorcycle configured to lead traveling wind taken from the front surface of the motorcycle to its air cleaner.

Description of the Related Art

A layout for taking in air supplied to the engine from around the head pipe is superior in terms of the intake efficiency and the placement efficiency of the component. For instance, JP H10-035559 A discloses a layout of this type in which traveling wind taken in from the front of the vehicle is allowed to pass through an air passage provided through the front of the body frame.

The intake duct for taking in traveling wind through the space between the right and left front forks is disposed to have some clearance from the front forks such that the intake duct does not interfere with the movement of the front forks even when the handlebar is steered to the maximum.

However, in the conventional technique, there is a problem that the cross-sectional area of the intake duct is limited to make the orbital movement of the front forks ensured and the efficiency of introducing traveling wind to the engine cannot be enhanced.

SUMMARY OF THE INVENTION

An object of the present invention is to provide an intake duct structure of a motorcycle that allows large handling and is improved in efficiency of introducing travelling wind to the engine.

An intake duct structure of a motorcycle includes front forks disposed on both of right and left sides of a head pipe of a body frame and a main frame extending obliquely backward and downward from the head pipe, wherein the intake duct structure extends from a front end of the motorcycle toward the head pipe and is formed in such a manner that an interfered area where a rotational orbit of the front forks at a time of steering overlaps the intake duct structure is elastically deformable.

According to the present invention, the intake duct structure of the motorcycle that allows large handling and is improved in efficiency of introducing travelling wind to the engine is provided.

DETAILED DESCRIPTION

Hereinbelow, embodiments of the present invention will be described by referring to the accompanying drawings.

As to an intake duct structure of a motorcycle according to the present invention (hereinafter simply referred to as "the intake duct structure"), the following embodiment will be described for a case where the body frame is a twin spar type; however, the intake duct structure is applicable not only to the twin spar type but also to other types such a double cradle frame and a monocoque frame. Further, the term "motorcycle" may also include a three-wheeled motor vehicle (i.e., motor tricycle) which has two rear wheels.

In the following embodiment, directional terms such as upper, upward, lower, downward, right, left, front, and rear are used with reference to a rider (driver) riding on the vehicle. In each figure, the forward direction of the vehicle is indicated by an arrow FW, the backward direction of the vehicle is indicated by an arrow BW, the left direction of the vehicle is indicated by an arrow L, the right direction of the vehicle is indicated by an arrow R, the upward direction of the vehicle is indicated by an arrow U, and the downward direction of the vehicle is indicated by an arrow D, when necessary. In each figure, some components are omitted for simplifying the description when deemed unnecessary.

First, a structure around a body frame 11 of the motorcycle equipped with an intake duct 10 according to the embodiment will be described by referring to FIG. 1 to FIG. 3.

Figure 1:
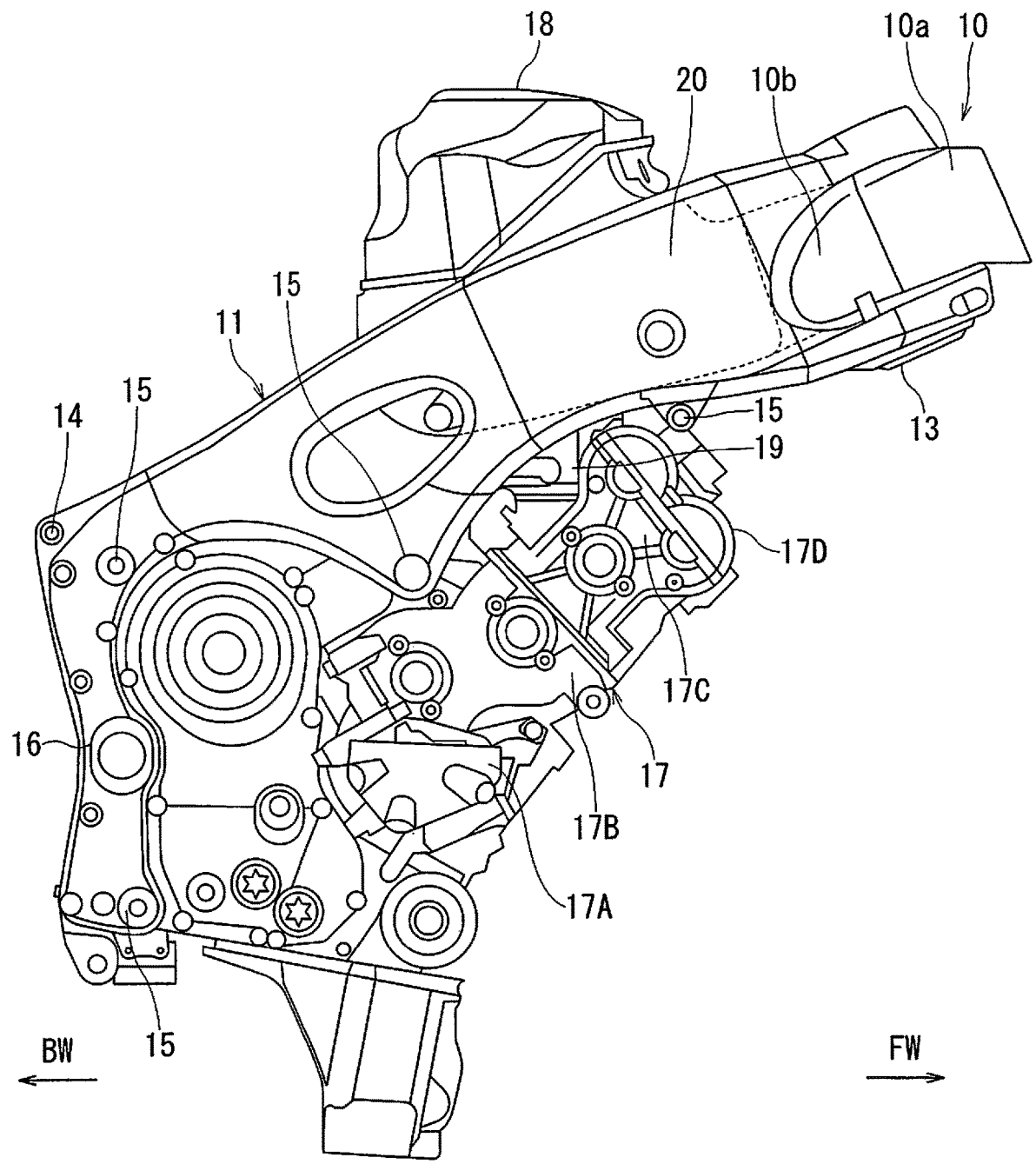
FIG. 1 is a schematic right side view of a body frame to which an intake duct according to one embodiment is attached and the peripheral components of the intake duct.

FIG. 1 is a schematic right side view of the body frame 11, to which the intake duct 10 according to the embodiment is attached, and the peripheral components of the intake duct 10.

Figure 2:
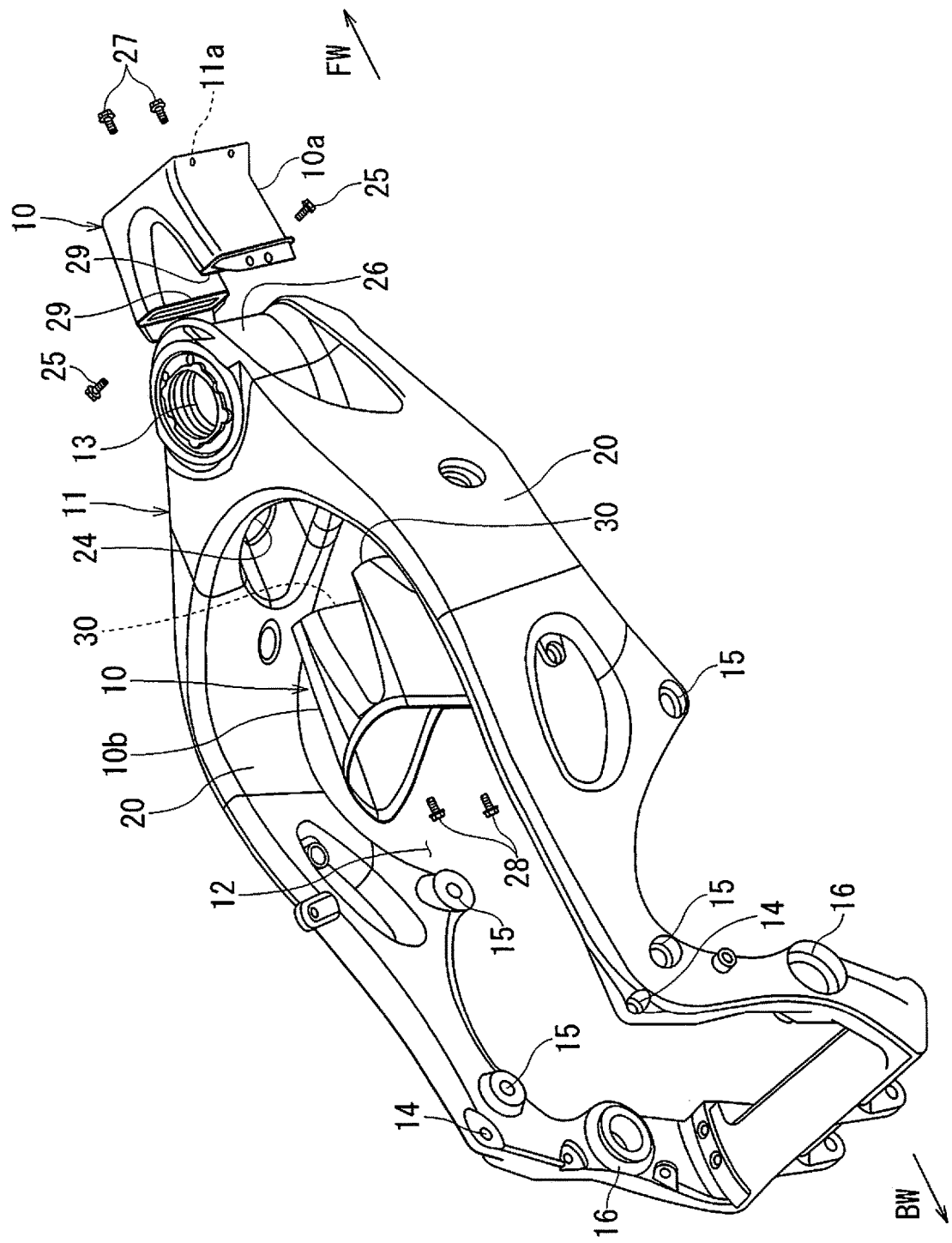
FIG. 2 is an exploded perspective view of the body frame and its peripheral components as viewed from the rear upper right side.

FIG. 2 is an exploded perspective view of the body frame 11 and its peripheral components as viewed from the rear upper right side.

Figure 3:
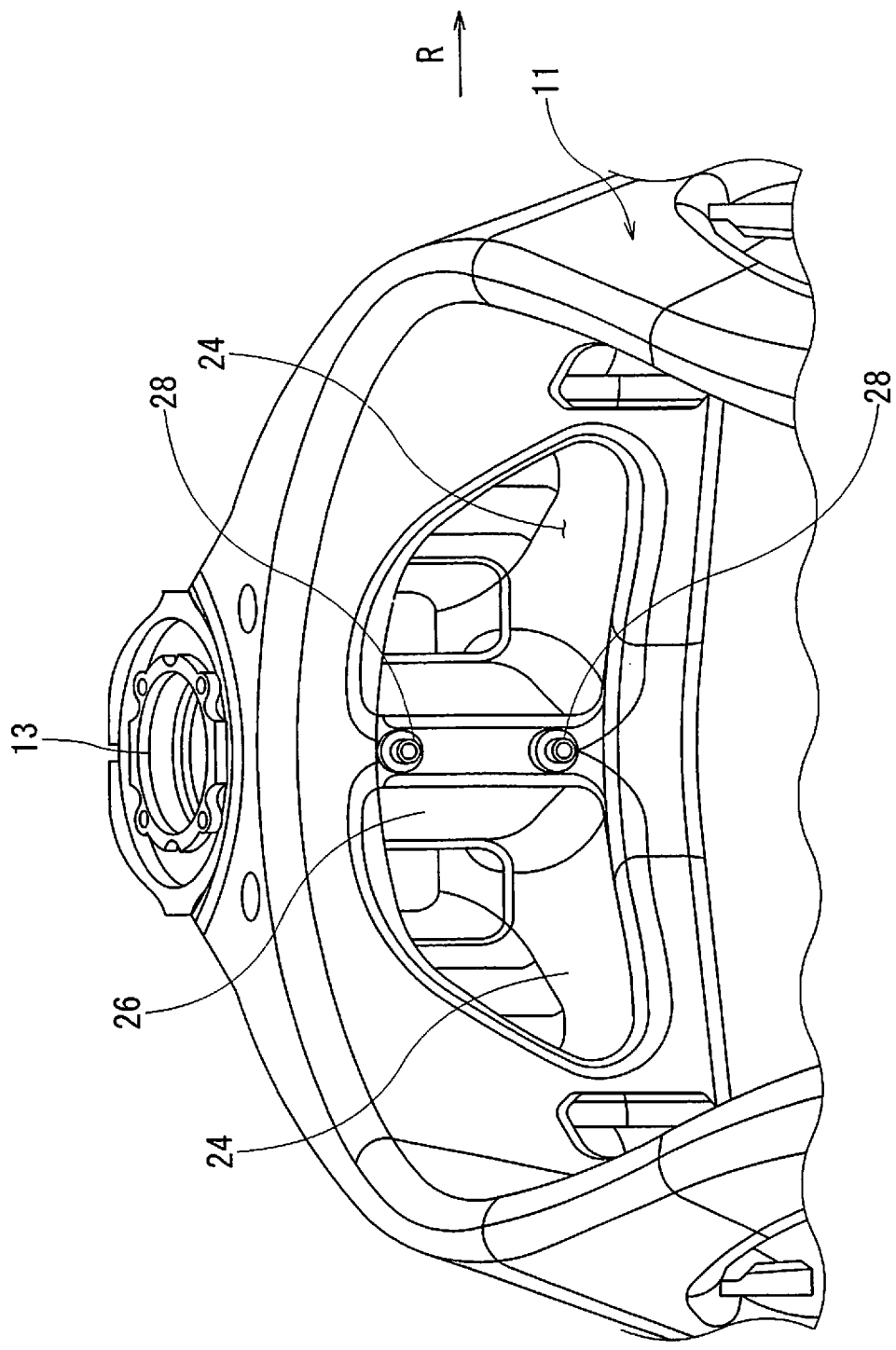
FIG. 3 is a rear view around a head pipe as viewed from within the space of the body frame.

FIG. 3 is a rear view around a head pipe 13 as viewed from within the space 12 of the body frame 11.

As shown in FIG. 1 and FIG. 2, the body frame 11 is, e.g., a so-called twin spar frame which is preferably applied to a vehicle to which high speed performance is required.

In the body frame 11, the main frame 20 branches toward right and left from the rear of the head pipe 13 to the rear and extends rearward and downward so as to form an annular shape including the head pipe 13 in plan view. The body frame 11 has a vertical width (i.e., width in the up-and-down direction) that is almost equal to the length of the head pipe 13. At the rear of the body frame 11, a seat rail support 14 for fixing a seat rail which inclines backward and upward is provided. Under the seat rail support 14 in the rear portion of the body frame 11, a pivot 16 for supporting a swing arm is provided in such a manner that the swing arm can swing in the up-and-down direction.

In the body frame 11, an engine unit 17 is suspended by plural engine mounts 15 so as to be held by the body frame 11.

The engine of the engine unit 17 is, e.g., a four-stroke multi-cylinder engine, typically a parallel four-cylinder engine. The engine unit 17 is formed by sequentially and integrally connecting a cylinder 17B, a cylinder head 17C, and a cylinder head cover 17D on the top portion of a crankcase 17A. The engine unit 17 is integrally joined to and supported by the body frame 11 and thereby functions as a rigid member of the body frame 11.

A fuel tank is mounted on the body frame 11 above the engine unit 17.

In the egg-shaped space 12 of the body frame 11, an air cleaner box 18 above the cylinder head 17C is supported by the body frame 11 and its peripheral components. The air cleaner box 18 is connected to an intake port at the rear of the cylinder head 17C by an intake passage 19. Air is drawn into the intake passage 19 by the engine negative pressure, mixed with the fuel supplied from a fuel supply device, and supplied into the cylinder head 17C. When the intake duct 10 according to the embodiment is applied to a motorcycle for traveling on a public road, an air filter is provided in the air cleaner box 18.

Figure 4:
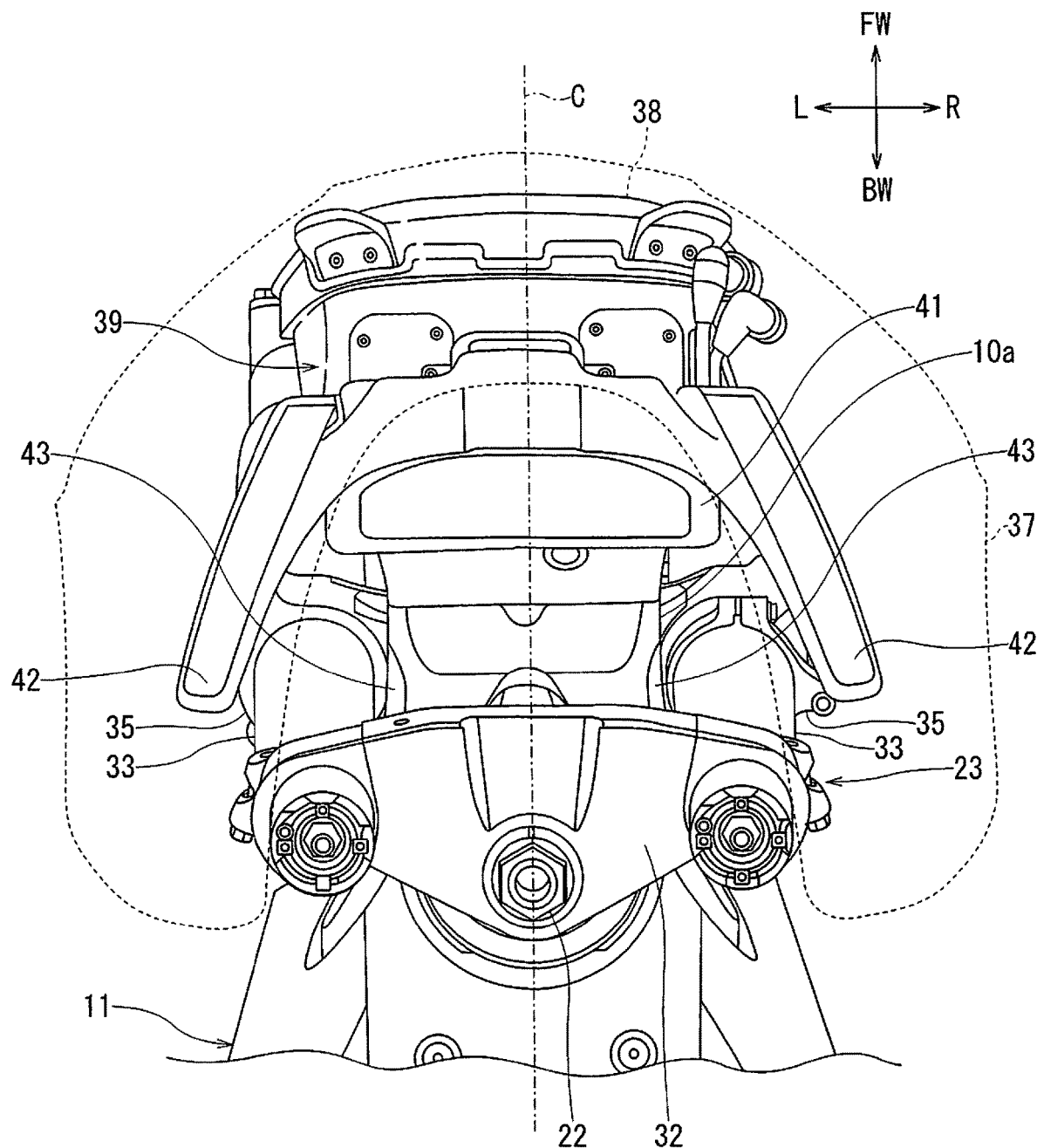
FIG. 4 is a partial plan view around a stem shaft of a motorcycle to which the intake duct according to the embodiment is attached.

At the front of the body frame 11, a stem shaft 22 is inserted into the head pipe 13 by a bearing as shown in FIG. 4. The stem shaft 22 serves as the rotation center related to steering of a steering mechanism 23 described below.

On the right and left of the head pipe 13 as shown in FIG. 2 and FIG. 3, respective holes 24 penetrating the body frame 11 in the vehicle longitudinal direction (i.e., in the front-and-rear direction of the vehicle body) are formed.

A supporter 26 of the head pipe 13 forming the side surface of each hole 24 on the axle side has an approximately oval shape, and the long side of which extends in the vehicle longitudinal direction.

Two forked duct members (also referred to as a front intake duct and a rear intake duct) 10a and 10b constituting the intake duct 10 are inserted so as to encircle the head pipe supporter 26 in the front-and-rear direction.

As shown in FIG. 2, the forked duct members 10a and 10b are coupled to each other by fasteners 25 inside the right and left holes 24 in the front-and-rear direction.

Of the components of the intake duct 10, the front intake duct 10a inserted into the holes 24 from the front of the vehicle body is fixed to the front end of the head pipe supporter 26 at, e.g., two upper and lower positions with screws 27.

Of the components of the intake duct 10, the rear intake duct 10b disposed inside the space 12 of the body frame 11 is inserted into the holes from the rear and fixed to the head pipe supporter 26 with screws 28.

The rear end opening 29 of the rear bifurcated portion in the front intake duct 10a is connected to the front open end 30 of the front bifurcated portion of the rear intake duct 10b, so that the forked duct members (front and rear intake ducts) 10a and 10b constitute, as a whole, the intake duct 10.

FIG. 4 is a partial plan view around the stem mechanism 23 of the motorcycle to which the intake duct 10 according to the embodiment is attached.

As shown in FIG. 4, the steering mechanism 23 is formed by fixing a pair of right and left front forks 33 for supporting the front wheel to a top bridge 32, which is in the shape of an inverted triangle and fixed to the upper end portion of the stem shaft 22.

Further, a handlebar is fixed to the top bridge 32 via a non-illustrated handle clamp.

The right and left front forks 33 are further fixed to an under bracket 35 at the lower portion of the head pipe 13, and receive steering by the handlebar in a state in which the distance between the right and left front forks 33 is maintained.

The intake duct 10 is disposed, e.g., between the right and left front forks 33. The collective opening 36 at the front end of the front intake duct 10a communicates with (i.e., is spatially connected to) an air intake port 38 opened at the front surface of the front cowl 37 via a communicating cowl 39.

The communicating cowl 39 is a duct which functions to extend the air intake port 38 into the front cowl 37 to connect the air intake port 38 with the front intake duct 10a. Electrical devices such as a meter panel 41 are put and fixed to the communicating cowl 39. The front cowl 37 covers the front portion of the communicating cowl 39 and the meter panel 41, and is fixedly supported by a stay 42 integrally formed on the meter panel 41. The air cleaner box 18 is connected to the rear of the rear intake duct 10b.

The above-described connection of the front cowl 37, the communicating cowl 39, the front intake duct 10a, the rear intake duct 10b, the air cleaner box 18, and the intake passage 19 causes the traveling wind taken in from the front of the vehicle to pass through the both side surfaces of the head pipe 13 and to be blown to the engine unit 17.

Next, the intake duct 10 according to the embodiment will be described in more detail using FIG. 5 to FIG. 7.

Figure 5:
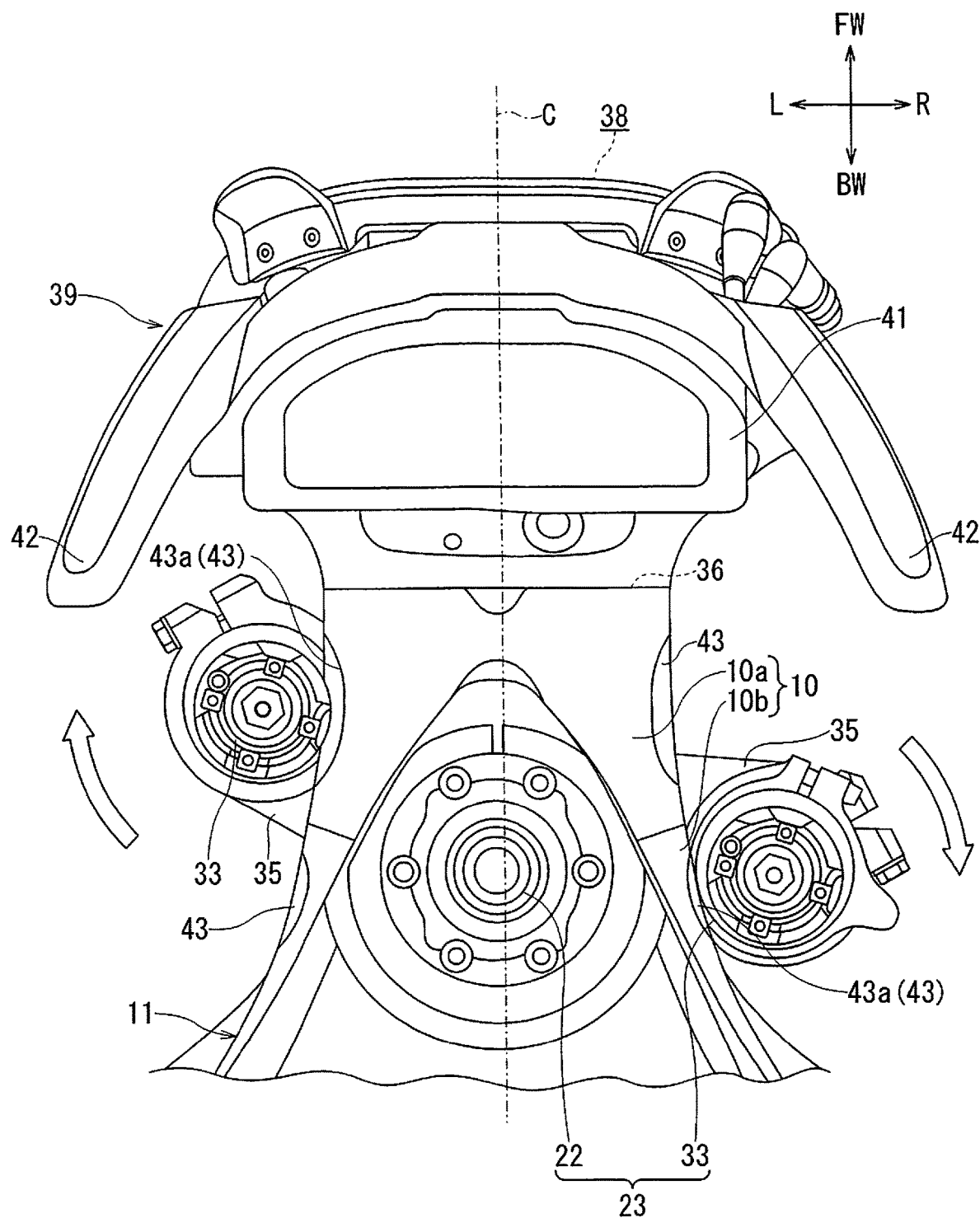
FIG. 5 is a partial plan view for illustrating a state in which the handlebar is turned to the right in FIG. 4.

FIG. 5 is a partial plan view for illustrating a state in which the handlebar is turned to the right in FIG. 4.

Figure 6:
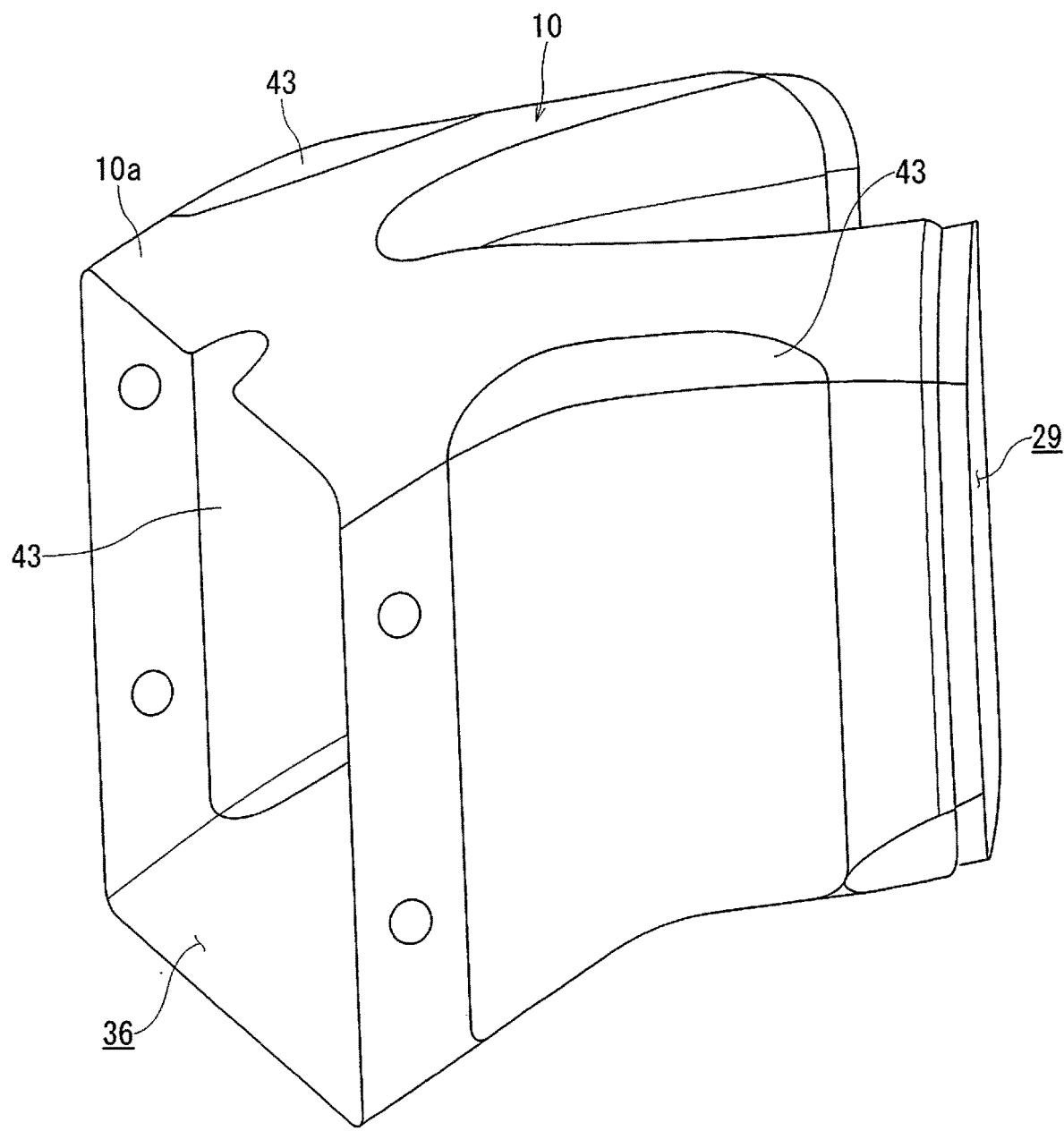
FIG. 6 is a perspective view for illustrating one aspect of a front intake duct according to the embodiment.

FIG. 6 is a perspective view for illustrating one aspect of the front intake duct 10a according to the embodiment.

Figure 7:
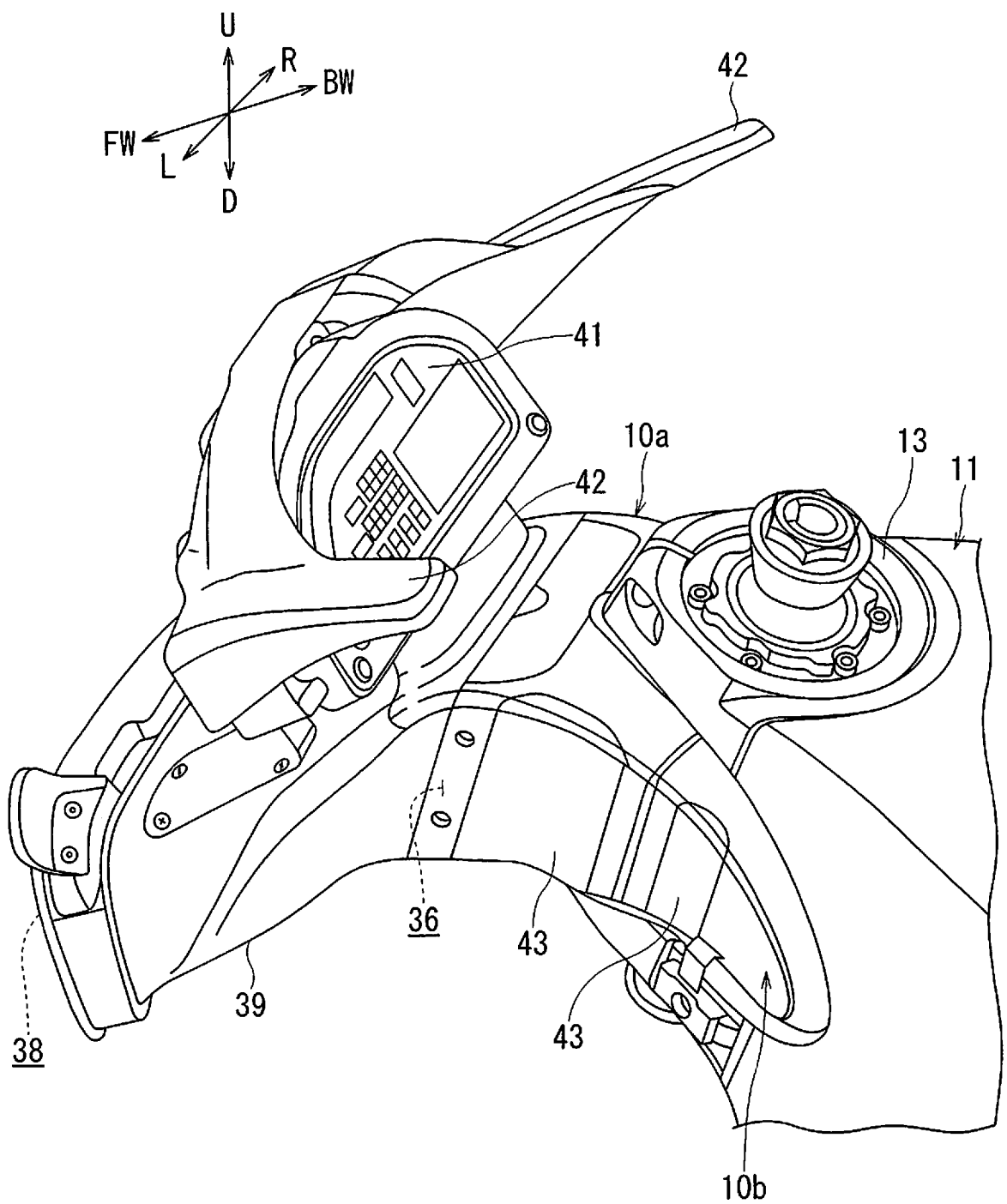
FIG. 7 is a perspective view of the vicinity of the head pipe of the motorcycle to which the intake duct according to the embodiment is attached.

FIG. 7 is a perspective view of the vicinity of the head pipe 13 of the motorcycle to which the intake duct 10 according to the embodiment is attached.

In FIG. 5 and FIG. 7, the front cowl 37 and the top bridge 32 are not shown.

The intake duct 10 is mainly composed of a material that withstands traveling wind and load of the front cowl 37 and the communicating cowl 39 for supporting the meter panel 41. That is, the intake duct 10 is desirably made of a material that has sufficient rigidity for functioning as a cowl brace capable of supporting the front cowl 37.

The materials which can be used for the intake duct 10 are, e.g., FRP (Fiber Reinforced Plastics), CFRP (Carbon Fiber Reinforced Plastics), metal, polypropylene, ABS resin, or NBR (nitrile rubber).

As shown in FIG. 5, when the handlebar is steered, the front forks 33 rotate around the head pipe 13 (stem shaft 22) in plan view and the front forks 33 come closer to the vehicle body center C extending in the vehicle longitudinal direction by this rotation.

For this reason, as shown in FIG. 4 and FIG. 5, the intake duct 10 is formed so as to overlap or interfere with the orbital movement (rotation) of the front forks 33 at the maximum steering of the handlebar. The interfered area 43 of this intake duct 10 is made of an elastic member such as silicon and is formed to be elastically deformable with respect to the pressure from the front forks 33 as shown in FIG. 4 to FIG. 7. Hereinafter, the interfered area 43 made of a flexible material is also referred to as an elastic portion 43a when necessary.

Depending on the type of motorcycle, only one of the front intake duct 10a and the rear intake duct 10b might interfere with the movement of the front forks 33. In these cases, it is sufficient when the elastic portion 43a is provided on either the front intake duct 10a or the rear intake duct 10b which interferes with the movement of the front forks 33.

The elastic portion 43a, which is elastically deformable, in the front intake duct 10a may include the peripheral portion of the interfered area 43 and may be larger than the interfered area 43. Additionally, the entirety of the front intake duct 10a may be made of elastic material so as to be deformed in the whole body when pressed by the front forks 33.

The elastic portion 43a of the front intake duct 10a is designed to have a shape and a range capable of absorbing a handlebar turning angle of at least about 5° to each of the right and left sides, and the handlebar turning angle of about 5° is a displacement range by self-aligning of the handlebar during traveling.

In order to satisfy the ease of handling, the motorcycle is preferably designed so as to be able to absorb the handlebar turning angle of about 30° to each of the right and left.

As to the handlebar turning angle larger than the self-aligning displacement range, there is no hindrance because it is usually operated by the driver's intention.

According to the intake duct 10 configured as described above, the following effects can be obtained.

(1) Since an elastic material is used for the interfered area 43 on the intake duct 10 interfered by the front forks 33, the intake duct 10 is formed to be elastically deformable when pressed by the front forks 33.

Since the intake duct 10 is configured to be elastically deformable, there is no need to provide a clearance between the intake duct 10 and the front forks 33, the intake duct 10 can have a large diameter.

In other words, the intake duct 10 can be increased in diameter and the intake efficiency of air to the engine unit 17 can be enhanced without inhibiting the displacement of the front forks 33.

(2) The intake duct 10 is disposed to pass between the right and left front forks 33.

Generally, when the handlebar is largely turned, the traveling speed is reduced and a large amount of air supply is not required. That is, what is required for improving the engine efficiency is that the intake duct 10 elastically deformed is recovered to the initial form to ensure a large-diameter duct cross-sectional area at the time of running straight. In other words, what is required for improving the engine efficiency is to increase the cross-sectional area of the intake duct 10 at the time when the front forks 33 are not displaced.

In the arrangement relationship between the intake duct 10 and the front forks 33 according to the embodiment, when the motorcycle travels straight to perform medium to high speed traveling requiring a large amount of intake, the elastic portion 43a is restored from deformation and thereby the maximum opening state of the intake duct 10 is achieved. That is, the intake duct 10 does not inhibit the displacement of the front forks 33 in the handlebar displacement range during straight traveling requiring a large amount of intake.

Thus, the diameter of the air supply passage can be increased without impairing the steering stability.

(3) The handlebar turning angle at which the front forks 33 does not abut or interfere with the functioning of the intake duct 10 is set at least 5° or more to the right and left sides from the straight state.

Since the handlebar turning angle operated by self-alignment during normal driving is generally 5° to the right and left, steering stability during driving can be achieved by designing the elastic portion 43a such that the handlebar turning angle of at least 5° to the right and left is ensured. In addition, turning of the handlebar in the stopped state (i.e., when the motorcycle is not running) is achieved by designing it to ensure a handlebar turning angle of about 30° to both right and left.

According to the present inventions, intake duct structures of motorcycles that allow large handling and are improved in efficiency of introducing travelling wind to the engine are provided.

The embodiments of the present invention have been described heretofore. However, the embodiments are merely given for the sake of example, and do not intend to limit the scope of the invention. The embodiments can be carried out in other various modes, and various omissions, replacements, and changes may be made thereto without departing from the gist of the invention. The accompanying claims and their equivalents are intended to cover such forms or modifications as would fall within the scope and spirit of the inventions.

For instance, the intake duct structure may be disposed so as to pass through the outside of the front forks 33. In this case, the interfered area 43 with the front forks 33 is the side surface on the vehicle center side of the intake duct structure.

What is claimed is:

1. An intake duct structure of a motorcycle, wherein the motorcycle includes a body frame that has a head pipe and a main frame extending obliquely backward and downward from the head pipe, front forks provided on both right and left sides of the head pipe, and a front cowl that covers a front of the body frame, and wherein the intake duct structure extends from a front end of the motorcycle toward the head pipe, the motorcycle intake duct structure comprising:

an intake duct that is disposed between the front forks and forms a part of the intake duct structure, and includes a body that has sufficient rigidity for supporting the front cowl of the motorcycle; and an elastic part provided on the intake duct, wherein the front forks on the sides of the intake duct contact the elastic part when the front forks are steered;

wherein the elastic part is made of different material from the body of the intake duct and is elastically deformable when the front forks contact the elastic part, and wherein the elastic part includes two elastic portions on each the right and left sides of the head pipe which make contact with the front forks respectively on the front right and front left side of the head pipe.

2. The intake duct structure of a motorcycle according to claim 1, wherein an holes are formed on the left and right sides of the head pipe to penetrate the body frame in the front-rear direction of the motorcycle, and wherein a bifurcated duct member that make up the intake duct is attached to the holes to enclose the head pipe from the front and rear direction of the motorcycle.

* * * * *